(12) United States Patent
Brown et al.

(10) Patent No.: US 9,106,483 B2
(45) Date of Patent: Aug. 11, 2015

(54) SYSTEMS AND METHODS FOR SERVING APPLICATIONS IN AN APPLICATION SERVER ENVIRONMENT

(71) Applicant: GOOGLE INC., Mountain View, CA (US)

(72) Inventors: Ryan David Brown, Mountain View, CA (US); Jon P. McAlister, San Francisco, CA (US); Kevin A. Gibbs, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 324 days.

(21) Appl. No.: 13/830,005

(22) Filed: Mar. 14, 2013

(65) Prior Publication Data

US 2013/0246511 A1 Sep. 19, 2013

Related U.S. Application Data

(60) Provisional application No. 61/612,085, filed on Mar. 16, 2012.

(51) Int. Cl.
  *H04L 29/08* (2006.01)
  *G06F 9/48* (2006.01)

(52) U.S. Cl.
  CPC .......... *H04L 29/08702* (2013.01); *G06F 9/485* (2013.01); *H04L 67/28* (2013.01)

(58) Field of Classification Search
  CPC .... H04L 67/28; H04L 29/08702; G06F 9/485
  See application file for complete search history.

(56) References Cited

U.S. PATENT DOCUMENTS

| | | | |
|---|---|---|---|
| 6,848,106 B1 * | 1/2005 | Hipp | 719/312 |
| 8,005,950 B1 * | 8/2011 | Ashcraft et al. | 709/224 |
| 8,296,384 B2 * | 10/2012 | Pattan et al. | 709/207 |
| 2002/0166117 A1 | 11/2002 | Abrams et al. | |
| 2005/0021917 A1 * | 1/2005 | Mathur et al. | 711/159 |
| 2007/0011330 A1 * | 1/2007 | Dinker et al. | 709/226 |
| 2008/0276117 A1 * | 11/2008 | Tran et al. | 714/4 |

OTHER PUBLICATIONS

International Search Report dated Jun. 11, 2013 for International Application No. PCT/US2013/031511.
Written Opinion of the International Searching Authority dated Jun. 11, 2013 for International Application No. PCT/US2013/031511.
Z. Al-Qudah et al., "Efficient application placement n dynamic hosting platform", Apr. 2009, pp. 281-290, Retrieved from the internet: URL:http//www2009.org/proceedings/pdf/p281.pdf [retrieved on May 27, 2013].

* cited by examiner

*Primary Examiner* — Nicholas Taylor
*Assistant Examiner* — Afroza Sultana
(74) *Attorney, Agent, or Firm* — Birch, Stewart, Kolasch & Birch, LLP

(57) ABSTRACT

In a distributed application execution system having a plurality of application servers, each application server has volatile and nonvolatile storage as well as computational resources for executing applications as follows. A plurality of applications is stored in non-volatile storage. At least one such application is a primed application which is derived as follows. An unprimed application is executed and an initialization signal is optionally communicated to the unprimed application. A status signal is obtained from the unprimed application. Upon receipt of the status signal, the unprimed application is checkpointed to produce the primed application, and the primed application is stored. A request to execute the primed application is received from a client system. In response to the request, the primed application is loaded from non-volatile storage into volatile storage, and the primed application is executed. The primed application returns a result to the request to the client system.

27 Claims, 9 Drawing Sheets

SYSTEMS AND METHODS FOR SERVING APPLICATIONS IN AN APPLICATION SERVER ENVIRONMENT

CROSS REFERENCE TO RELATED APPLICATION

The present application claims the benefit of priority from U.S. Provisional Application Ser. No. 61/612,085, filed Mar. 16, 2012, which is incorporated herein by reference in its entirety.

TECHNICAL FIELD

The disclosed embodiments relate generally to methods and systems, sometimes called application servers, for hosting and executing large numbers of heterogeneous applications.

BACKGROUND

In general, increases in an application's popularity could present a variety of scalability problems that negatively impact a user's experience. For example, users could experience slower response times, slower page loading, and increased time outs on page requests. These scalability problems are typically alleviated by allocating additional resources to the application such as more storage, more memory, more CPUs, and more machines in general.

Allocating or installing more computing capacity may be a reasonable solution when increases in an application's popularity are experienced over a prolonged period of time, or when usage of the application is predictable. Similarly, when an application experiences a decrease in usage, removing computing capacity previously allocated to the application may be a reasonable solution, especially when this is experienced over a prolonged period of time, or when the decrease is predictable. However, the popularity of an application is often unpredictable, due to a variety of factors (e.g., time of day, current events, advertising, trends, etc.), and fluctuates to a large extent, which creates load spikes and dips in the application execution or hosting system.

Predefined allocations of computing resources are inefficient solutions for handling temporary load spikes and dips. Increasing or installing more computing resources to handle a load spike is inefficient, since the additional pre-allocated resources go unused when the spike disappears (e.g., when the spike in demand subsides, or the application's popularity dips). Similarly, decreasing computing resources allocated to an application when its popularity declines is also inefficient, since future usage spikes will require the re-allocation of previously removed resources back to the application.

To complicate matters further, application systems may host a large number of heterogeneous applications, each with its own set of fluctuating resource requirements. Pre-allocation of resources, for the reasons discussed above, is often an inefficient solution for ensuring consistent positive user experiences among heterogeneous applications hosted on an application system.

SUMMARY

The present invention overcomes the limitations and disadvantages described above by providing methods, systems, and computer readable storage mediums for quickly starting applications.

The following presents a summary of the invention in order to provide a basic understanding of some of the aspects of the invention. This summary is not an extensive overview of the invention. It is not intended to identify key/critical elements of the invention or to delineate the scope of the invention. Its sole purpose is to present some of the concepts of the invention in a simplified form as a prelude to the more detailed description that is presented later.

Some embodiments provide an application execution system having a plurality of application servers. Each application server has non-volatile storage for storing a plurality of applications as well as volatile storage. Each application server also has computational resources for executing applications in response to requests received by the application execution system. A respective application server includes instructions for performing the following. To begin, a plurality of applications distributed to the respective application server is stored in non-volatile storage. One or more of the applications in the plurality of applications is a primed application. In other words, the one or more applications are each in a primed state.

The primed state of a primed application is derived as follows. An application, initially in an unprimed state and therefore termed an "unprimed application", is executed. An initialization signal is optionally communicated to the unprimed application. A status signal is obtained from the unprimed application. Upon receipt of the status signal, the unprimed application is checkpointed to produce the primed application.

The now primed application is stored in the non-volatile storage of the respective application server. Then a request to execute the primed application is received from a client system distinct from the plurality of application servers. In response to the request, the primed application is loaded from non-volatile storage into volatile storage, and the primed application is executed. A first result to the request, provided by the primed application, is then returned to the client system.

Some other embodiments provide a method of operating an application server in a system having a plurality of application servers. The method is performed as follows. To begin, a plurality of applications distributed to the application server is stored in non-volatile storage. One or more of the applications in the plurality of applications is a primed application, which is in a primed state. The primed state of the primed application is derived as follows. An unprimed application is executed. An initialization signal is optionally communicated to the unprimed application. A status signal is obtained from the unprimed application. Upon receipt of the status signal, the unprimed application is checkpointed to produce the primed application. The now primed application is stored in the non-volatile storage. Then a request to execute the primed application is received from a client system distinct from the plurality of application servers. In response to the request, the primed application is loaded from non-volatile storage into volatile storage, and the primed application is executed. A first result responsive to the request, provided by the primed application, is returned to the client system.

Yet other embodiments provide a non-transitory computer readable storage medium storing one or more programs configured for execution by an application server in an application execution system having a plurality of application servers. The programs include instructions to perform the following. To begin, a plurality of applications distributed to the application server is stored in non-volatile storage. One or more of the applications in the plurality of applications is a primed application, which is in a primed state. The primed state of the primed application is derived as follows. An unprimed application is executed. An initialization signal is optionally communicated to the unprimed application. A status signal is obtained from the unprimed application. Upon receipt of the status signal, the unprimed application is checkpointed to produce the primed application. The now primed application is stored in the non-volatile storage. Then a request to execute the primed application is received from a client system distinct from the plurality of application servers. In response to the request, the primed application is loaded from non-volatile storage into volatile storage, and the primed application is executed. A first result to the request, provided by the primed application, is returned to the client system.

These methods, systems, and non-transitory computer readable storage medium provide new, more efficient ways for an application server in an application execution system to quickly respond to client applications requests using less resources such as random access memory.

BRIEF DESCRIPTION OF THE DRAWINGS

Like reference numerals refer to corresponding parts throughout the several views of the drawings.

DESCRIPTION OF EMBODIMENTS

Figure 1:
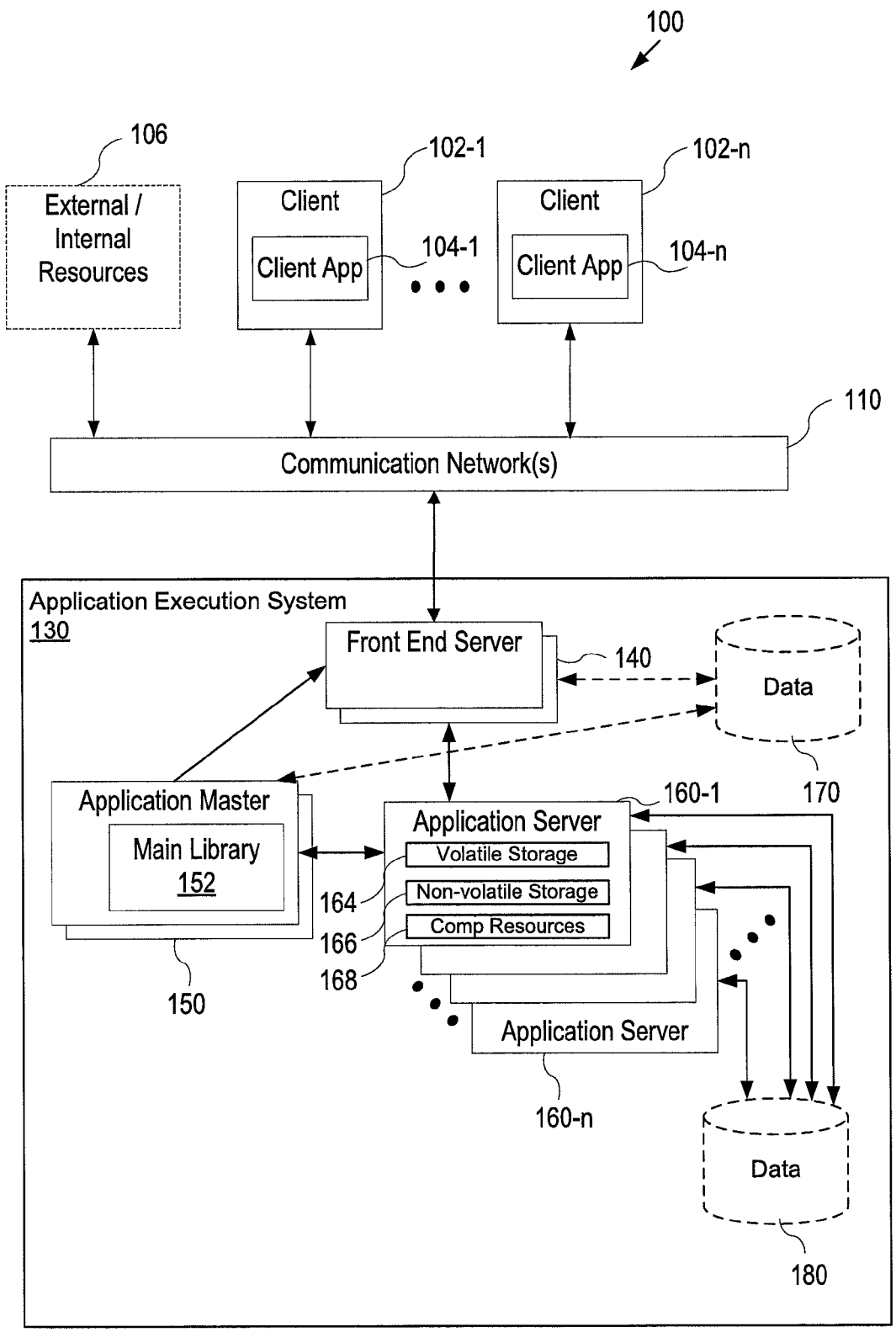
FIG. 1 is a block diagram of a distributed computing system including an application execution system according to certain embodiments.

FIG. 1 is a block diagram of a distributed computing system 100 including an application execution system 130 connected to a plurality of clients 102 (e.g. 102-1 . . . 102-n) through a network 110 such as the Internet, other wide area networks, local area networks, metropolitan area networks, wireless networks, or any combination of such networks. In some embodiments, a respective client 102 contains one or more client applications 104 (e.g. 104-1 . . . 104-n), such as a web browser, for submitting application execution requests to the application execution system 130. The client 102 (sometimes called the "client device" or "client computer") may be any computer or similar device through which a user of the client 102 can submit requests to and receive results or services from the application execution system 130. Examples include, without limitation, desktop computers, notebook computers, tablet computers, mobile devices such as mobile phones, personal digital assistants, set-top boxes, or any combination of the above.

In some embodiments, the application execution system 130 includes a front-end server 140, which receives application execution requests from clients 102 and returns results to the requesting clients.

The application execution system 130 also includes a plurality of application servers 160 (e.g., 160-1 through 160-n). Each of the application servers 160 includes volatile storage 164 for executing one or more applications, non-volatile storage 166 for storing one or more applications, and computational resources 168 for executing applications in response to requests received by the application execution system 130. In some embodiments, the application server 160 loads applications into volatile storage 164 from a remote data store (such as data store 170 or data store 180) rather than from non-volatile storage 166.

In some embodiments, the application execution system 130 also includes an application master 150 that distributes unprimed applications, from a main library 152 having a plurality of applications, among the application servers 160. In the embodiment shown in FIG. 1, the main library 152 is stored in the application master 150. Alternately, the main library 152 may be stored remotely from the application master, such as in a data store 170. In some embodiments, each application of the plurality of applications in the main library 152 is a web application that is responsive to HTTP requests or other requests. However, the present disclosure can also be used in non-web based environments, in which case the applications need not be web-based applications responsive to HTTP requests.

In some embodiments, the application execution system 130 includes a data store 170 accessible to at least the application master 150 and the front-end server 140, for sharing information about the location of applications among the application servers 160 and resource usage or loading information with respect to the application servers 160.

As disclosed in more detail below, each application server 160 has the ability to checkpoint an application and store the checkpoint as a primed application. In some embodiments, such checkpointing is done under the direction of the application master 150, with the respective application server 160 actually carrying out the checkpointing. In some embodiments, the application execution system 130 includes a data store 180 that is accessible to each of the application servers 160, for storing such primed applications. In this way, the application servers may share primed applications. It will be appreciated that data store 180 and data store 170 may, in fact, be the same physical data store. However, they are illustrated as different physical data stores in FIG. 1 to emphasize that the application master does not require access to primed applications in some embodiments of the present disclosure.

Optionally, the distributed system 100 includes additional resources 106, which may be located either internally or externally to the system 100, for use when executing applications in the application execution system 130. For example, an application executed by the application execution system 130 may access information in one or more of the additional resources 106 in order to process a request received from a respective client 102.

Figure 2:
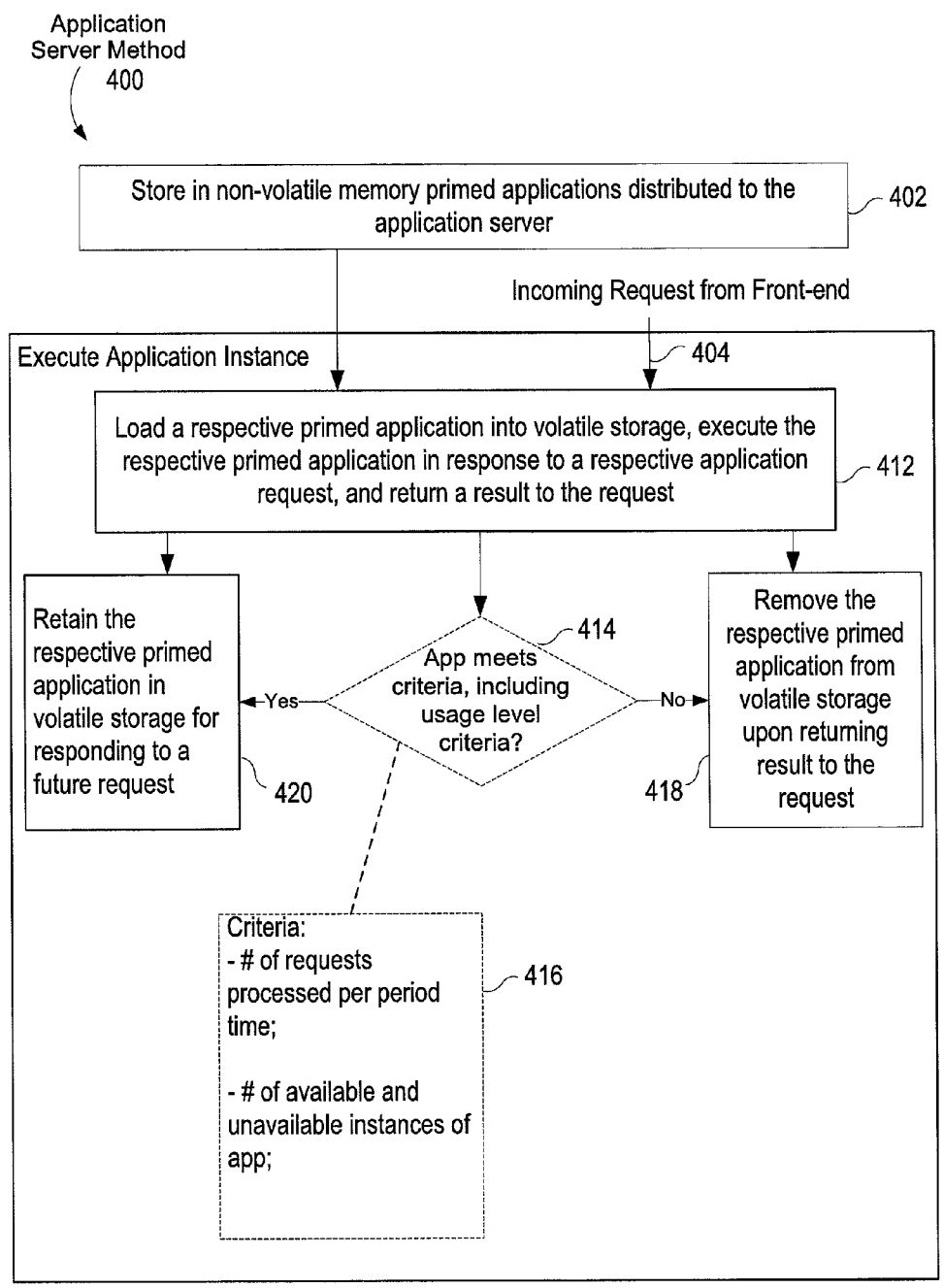
FIG. 2 is a flow diagram illustrating a method performed by an application server according to certain embodiments.

FIG. 2 is a flow diagram illustrating a method 400 performed by an application server 160 according to certain embodiments. Applications distributed to an application server 160 by the application master 150 are stored in the application server's non-volatile memory (402). These applications are primed by the application server (or another application server and distributed to the application server) in accordance with the method described with reference to FIG. 3. In some embodiments, in response to an application request (404), such as an HTTP request, from the front-end server 140 and, in turn, from a client 102, the application server loads the requested primed application from non-volatile storage into volatile storage, executes the requested primed application, and returns a result to the request (412). Responding to the request is described with reference to FIGS. 4A and 4B. The application server may remove one or more applications from volatile memory before performing operation 412, when there is insufficient volatile memory to process the request. Also, the application server may automatically remove applications from volatile memory when the amount of available volatile storage is below a predefined threshold.

In some embodiments, after returning the result to the request, the application server removes respective primed application from volatile storage (418). In other words, after the request is returned, the primed application is terminated from volatile storage. In other embodiments, after returning the result responsive to the request, the application server optionally retains the respective primed application in volatile storage (420) for responding to future requests. In embodiments where the primed application is retained in volatile storage after the first result is returned, the primed application is able to process additional requests received by the application server from a the front-end server 140, and then returns a result to the additional request (e.g., it returns a second result) according to the same or similar process described for operation 412 above.

In some embodiments, the application server, in determining whether or not to retain a primed application in non-volatile storage after processing a request, optionally determines whether one or more predefined usage criteria have been met (414). In such embodiments, the primed application is either removed (418) or retained (420) depending on whether the one or more predefined criteria have been met or not. In some embodiments, the one or more predefined criteria (416) used by the application server include one or more usage level criteria, which may include the number of requests for the application processed by the application in a given period of time. The one or more predefined criteria may also include one or more caching criteria, which may include the number of respective primed application instances in volatile storage available for handling new requests, and the number of respective primed application instances handling active requests and therefore not available for handling new requests. Cached primed application instances are discussed in more detail below with reference to FIG. 4B. The one or more predefined criteria may also include one or more error criteria, which may be based on the number of errors encountered during execution of the primed application, and the type of errors encountered. For example, the application server may remove the respective primed application from volatile storage if severe errors are encountered during N (e.g., N equal to 5, 10 or 20, etc.) consecutive executions of the application. For a primed application that fails to meet the predefined criteria (414—No), the application server removes the respective primed application from volatile storage upon returning the result responsive to the request (418). In some embodiments, the application server may remove the respective primed application from volatile storage according to a predefined order for removal. For example, the application server may remove the least recently used primed application.

In some embodiments, when determining whether to remove a primed application instance from volatile storage, the application server may take into account the service quality level of the primed application relative to other instances of the application server resident in volatile memory. The service quality level of each primed application may be based on the level of service requested, or paid for. Various forms of preferences (for retention of primed application instances in volatile memory) may be given to primed applications with high service quality levels, compared to primed applications with lower service quality levels. For example, lower service quality level primed application instances may be evicted before higher service quality level primed application instances whenever a predefined condition is true. The predefined condition may relate to numbers or ratios of lower and higher service quality level application instances loaded in volatile memory. Alternately, scores may be computed to determine which application instances to unload from volatile memory, and computation of the scores may take into account the service quality levels of the primed applications.

In some embodiments, a decision as to whether to remove a primed application from volatile storage is made by a process external to the application server 160. For example, in some embodiments a "bulletin board" tracks a number of instances of a given primed application that are running in the plurality of application servers 160. This number of instances is compared to an amount of requests that are being received by front end server 140 for the given primed application (e.g., a primed application demand). When the primed application demand for a given primed application fails to satisfy a predetermined demand threshold, one or more respective application servers 160 are permitted to remove the given primed application from volatile storage. When the primed application demand for a given primed application satisfies a predetermined demand threshold, application servers in the application execution system 130 are not permitted to remove the given primed application from volatile storage. Advantageously, in some embodiments, because primed applications are executed from non-volatile storage on balance faster than conventional unprimed applications, the predetermined demand threshold may be set to less restrictive levels than are used for unprimed applications. In some embodiments a query of the primed application demand for a given primed application is determined on a repeating basis (e.g., a few times each hour, hourly, a few times each day, daily, etc.) over time rather than in response to a specified request to use the primed application.

In some embodiments, both (i) the one or more predefined criteria and (ii) a determination as to whether the predetermined demand threshold has been satisfied are used to determine whether to retain or remove a given application in volatile storage. In such embodiments, a given primed application is retained in the volatile storage of an application server when the primed application meets one or more predefined criteria after completion of a request on the application server. Moreover, in such embodiments, a given primed application is removed from the volatile storage of an application server when (i) the application fails to satisfy the one or more predefined criteria after completion of a request on the application server and (ii) the primed application demand for the given primed application fails to satisfy a predetermined demand threshold.

In some embodiments, when the primed application meets the one or more predefined criteria (414—Yes), the application server retains the application in volatile storage so that it responds to future requests for the application (420). In some embodiments, the application server retains more than one instance of the respective primed application in volatile storage in accordance with predefined caching criteria. In some embodiments, the application server limits the number of primed application instances in volatile storage. For example, the application server may limit the total number of primed application instances in volatile memory to ensure that there is sufficient volatile memory for other processing tasks. Alternatively, the application server may limit the number of instances of a respective primed application to ensure that other requested applications have access to sufficient volatile memory to service their requests. Advantageously, the application server can retain a minimum number of instances of the primed application in volatile memory because primed applications stored in non-volatile memory are configured to be executed fast enough to respond to requests, as detailed below.

Figure 3:
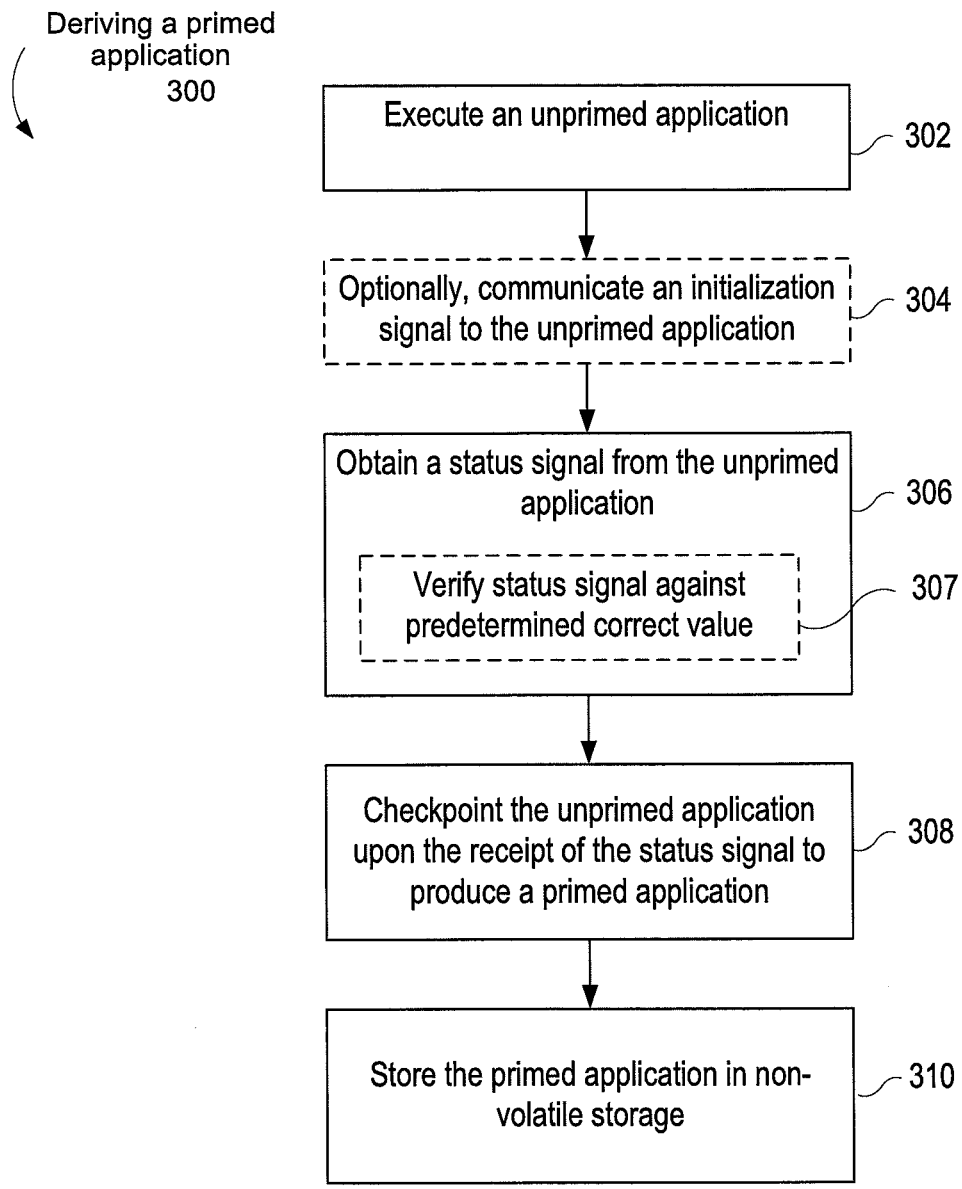
FIG. 3 is a flow diagram illustrating a method of deriving a primed application according to certain embodiments.

FIG. 3 is a flow diagram illustrating a method 300 of deriving a primed application performed by an application server according to certain embodiments. The application server executes an unprimed application (302). In some embodiments, executing includes copying the unprimed application from non-volatile memory to non-volatile memory on the respective application server and running the unprimed application. In some embodiments, the unprimed application is a compiled machine readable application, such as a binary executable. Such binary executables can be produced from any number of languages such as Fortran, C, and C++. In other embodiments, the unprimed application is interpreted. In instances where the unprimed application is interpreted, step 302 includes the steps of copying both the interpreter and the interpreted source code from non-volatile memory to volatile memory and running the source code within the interpreter. Examples of interpreted languages in which the source code may be written include, but are not limited to Java, Ruby, and Python, each of which include their own interpreter. In some embodiments, the unprimed application is run within a virtual machine. In such instances, the virtual machine is loaded into volatile memory and the unprimed application is executed within the virtual machine.

In some embodiments, once the unprimed application has been executed, either independently or in the context of an interpreter, an initialization signal is communicated to the unprimed application (304). In some embodiments, the initialization signal is a simple computation or message that is designed to be easily and quickly answered once the application has achieved an operational state. Examples of such initialization signals include, but are not limited to, communication of an ASCII character string, carriage return, control code, interrupt, or other signal. In some embodiments the initialization signal is similar to a warm up request. and is delivered the same way as a client request. For example, in a web application, the initialization request is an HTTP request with a special URL.

Responsive to the initialization signal, a status signal is obtained from the unprimed application (306). In some embodiments, the status signal is verified against a predetermined correct answer. In some embodiments, there is a library of correct answers and all that is required is that the status signal match a correct answer in the library of correct answers. In some embodiments, receipt of any status signal in response to the initialization signal indicates that the application is ready to be stored as a primed application, irrespective of the actual contents of the status signal.

In some embodiments, once the unprimed application has been executed, either independently or in the context of an interpreter, or a virtual machine, process control waits for the unprimed application to generate a status signal (306). In such embodiments, this status signal is obtained unprompted. For example, in such embodiments, the status signal is obtained without sending an initialization signal. In some embodiments, the status signal is verified against a predetermined correct value (307). That is, the status signal is required to match some predetermined signal that is deemed to indicate that the unprimed application has achieved an initialized state. In some embodiments, there is a library of correct values and all that is required is that the status signal match a correct value in the library of correct values. In some embodiments, receipt of any status signal indicates that the application is ready to be stored as a primed application, irrespective of the actual contents of the status signal.

Upon receipt of the status signal, either verified or unverified depending on the embodiment, the unprimed application is checkpointed to produce the primed application (308). Then the primed application is stored in non-volatile storage 166 of the application server. In some embodiments, the primed application is derived on a first application server 160-1 (302-308), and then the primed application is stored in the non-volatile storage of one or more other application servers 160-n, in addition to or instead of being stored in the non-volatile storage of the first application server 160-1. In some embodiments, the checkpoint is shared with a remote data store (170 or 180). In some embodiments, the checkpoint is only saved in the remote data store (170 or 180) and is not locally stored on any application server. In some embodiments, an application master distributes the primed application from the application server that derived the primed application to one or more other application servers.

In some embodiments, the checkpointing that occurs in (308) stores a snapshot of the application state. It is noted, that in some embodiments, the checkpoint also includes one or more process threads. In some embodiments, the checkpointing that occurs in 308 checkpoints the parent process associated with the application and any associated child processes. (However, in some embodiments, interpreters or virtual machines will natively support checkpointing rather than checkpointing the parent process.) In some embodiments, the checkpointing that occurs in 308 checkpoints file system abstractions associated with the application such as sockets and pipelines in addition to regular files. In some embodiments, all dynamic libraries, open files, sockets and FIFO's associated with the application are rolled into the checkpoint (i.e., the primed application). In some such embodiments where this is done, the primed application is restarted not only on the original application server 160 that performed the checkpoint, but also on application servers that have libraries and file systems that differ from the application server in which performed the checkpoint. Exemplary checkpointing techniques are disclosed in Elnozahy et al., "A survey of rollback-recovery protocols in message-passing systems", ACM Comput. Surv., vol. 34, no. 3, pp. 375-408, 2002; Ling et al., "A Variational Calculus Approach to Optimal Checkpoint Placement", IEEE Trans. Computers 50(7): 699-708 (2001); and Ahmed et al., "Cache-Aided Rollback Error Recovery (CARER) Algorithms for Shared-Memory Multiprocessor Systems", IEEE 20th International Symposium on Fault-Tolerant Computing (FTCS-20), Newcastle upon Tyne, UK, Jun. 26-28, 1990, pp. 82-88, each of which is hereby incorporated by reference in its entirety for its teachings on checkpointing.

In some embodiments, an application server 160 serves both primed applications and unprimed applications. For instance, in some embodiments, an unprimed application runs fast enough unprimed that it does not need a primed application. In some embodiments, an application server 160 serves an unprimed application because no primed version of the application is ready or because a primed application would be slower than the corresponding unprimed application. In some embodiments, an application server 160 serves the unprimed application unless a user pays a premium for the corresponding primed application (e.g., for instance through a service in which the user pays for enhanced speed).

Figure 4A:
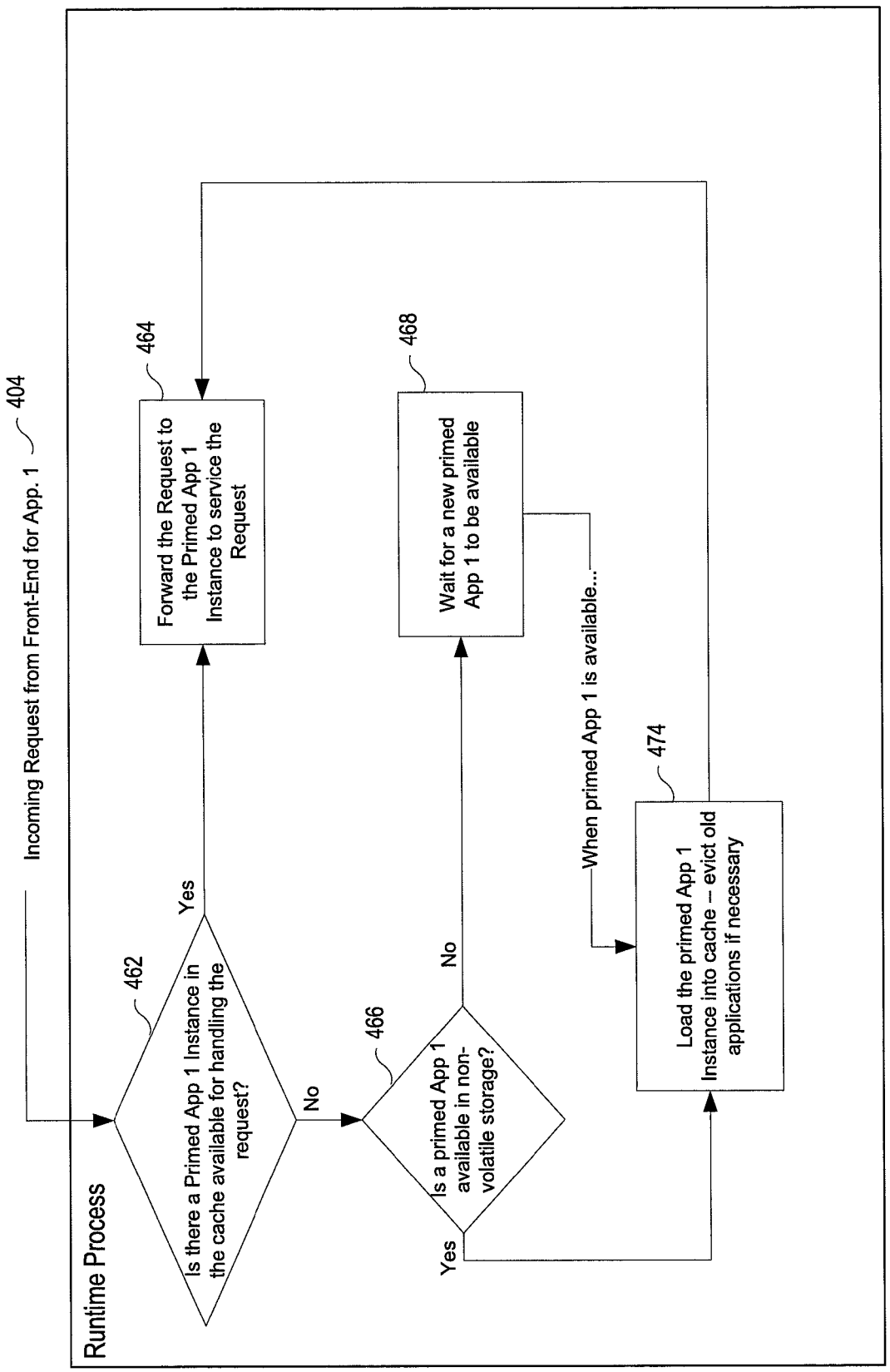
FIG. 4A is a flow diagram illustrating an example of a runtime process performed by an application server in accordance with some embodiments.

FIG. 4A is a flow diagram illustrating an example of a runtime process at the application server 160-1 in accordance with some embodiments. For the purposes of this example, it is assumed that the application server has sufficient resources available to handle an incoming request to execute an application. Upon receiving a request 404 from the front-end for "App 1," the application server queries the cache 450 (FIG. 4B) for an available "Primed App 1" instance for handling the request. If the cache returns an available "Primed App 1" instance (462—Yes), the request is forwarded to the "Primed App 1" instance for servicing the request and returning a result to the request (464). If the cache does not have an available "App 1" instance (462—No), the application server loads the primed App 1 from the non-volatile storage 166 of the application server (474) if the primed application is available in non-volatile storage (466—Yes). Then the request 404 is forwarded to the primed App 1 instance for servicing of the request (464).

Advantageously, because the App 1 in non-volatile storage is a primed application, the process of loading the primed App 1 into the cache 450 (474) and servicing the request (464) to produce a result responsive to the request can be performed quickly. In other words, the advantageous architecture of the present disclosure allows for execution of the primed App 1 directly from non-volatile storage 166 in response to a request 404. This is because the primed App 1 instance has already undergone all initialization routines and thus is ready to handle a request in real time, similar to the time scale in which an application resident in live process cache 450 would handle this request. Another benefit is that the disclosed systems and methods allow for a reduction in the number of instances of the application (primed App 1) that are needed in the live process cache 450 to handle a given number of requests 404 for App 1.

Figure 4B:
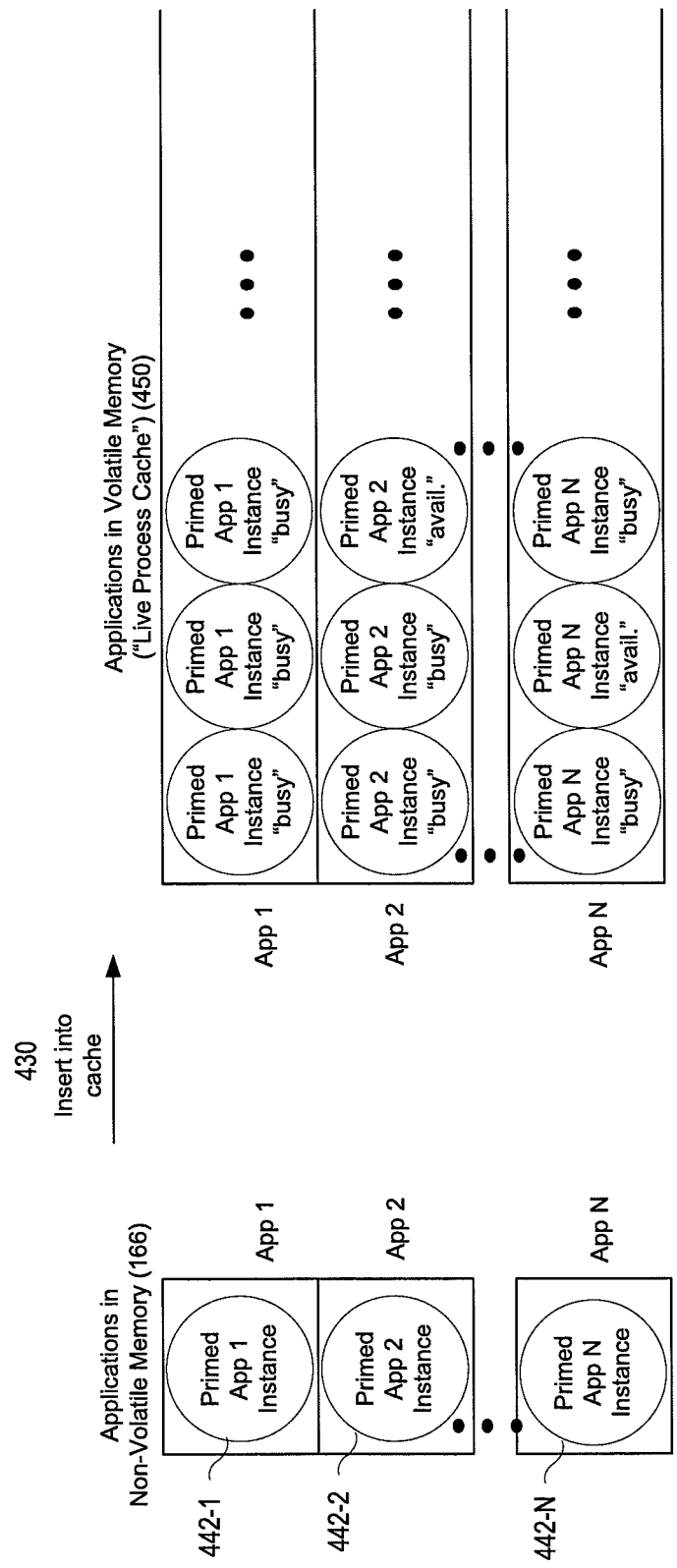
FIG. 4B is a conceptual diagram of a process for managing application instances in volatile memory by an application server in accordance with some embodiments.

In some embodiments, because the process of loading the primed App 1 from non-volatile memory in response to a request 404 can be performed so quickly, additional instances of the primed App 1 are not retained in the cache (e.g., the process proceeds directly from (412) to (418) in FIG. 2). Instead, they are terminated immediately after the request is returned. In other embodiments, "available" application instances, described with respect to FIG. 4B, are retained briefly to potentially service a second request. Then the "available" application instances are terminated once they have exceeded an idle time limit, e.g., they have remained in an "available" state without servicing a request longer than the idle time limit. In some embodiments, the idle time limit is 2 minutes. In most embodiments, the idle time limit ranges between 1 and 15 minutes. In some embodiments, no idle time limit is imposed, but idle times are still tracked. In these embodiments, when no resource is available to service a new request, the application having the longest (or one of the longest) idle time is removed from volatile memory to make space for a resource to handle requests for other types of applications hosted by the application server. As such, making a primed application, storing the primed application in non-volatile storage, and removing the primed application after servicing a request frees up resources in the volatile storage. In other words, the volatile storage is not clogged with applications previously loaded but not currently executing requests because a primed application needed to respond to a request can be quickly executed from non-volatile storage to return a result to the request. In some embodiments, no idle time limit is imposed, and idle times are not tracked.

FIG. 4B is a conceptual diagram of a process for managing primed application instances in volatile memory 164 by the application server 160-1 in accordance with some embodiments of the present disclosure. In some embodiments, the application servers actively manage application instances in volatile memory through a live process cache 450. An application server first derives one or more primed applications (e.g., primed App 1 Instance 442-1, primed App 2 Instance 442-2, . . . , primed App N Instance 442-N) and stores the primed application(s) in non-volatile memory 166, as described with respect to FIG. 3. The application server receives a request for "App 1." In some embodiments, in response to the request, a primed App 1 instance is loaded 430 into a cache (e.g., "Live Process Cache") 450. The cache may contain other instances of primed App 1 as well as instances of other requested applications. These application instances in the Live Process Cache 450 are either "busy" or "available," although other transitional states could be used in addition in other embodiments. A "busy" application instance is one that is processing one or more current requests (e.g., it is in an application request processing state and does not have enough CPU privileges or memory privileges to process an additional request or has reached a concurrent request limit), and therefore cannot process another incoming request until it finishes processing one of its current requests. The "available" instances are ready to process any received request for the respective application. In some embodiments, when all instances of the requested applications in the cache are "busy" a new version of the requested application is loaded into the cache 430, but when a requested primed application in the cache is "available," the "available" primed application will be used to respond to the request, rather than loading a new primed application instance from non-volatile memory.

Figure 5:
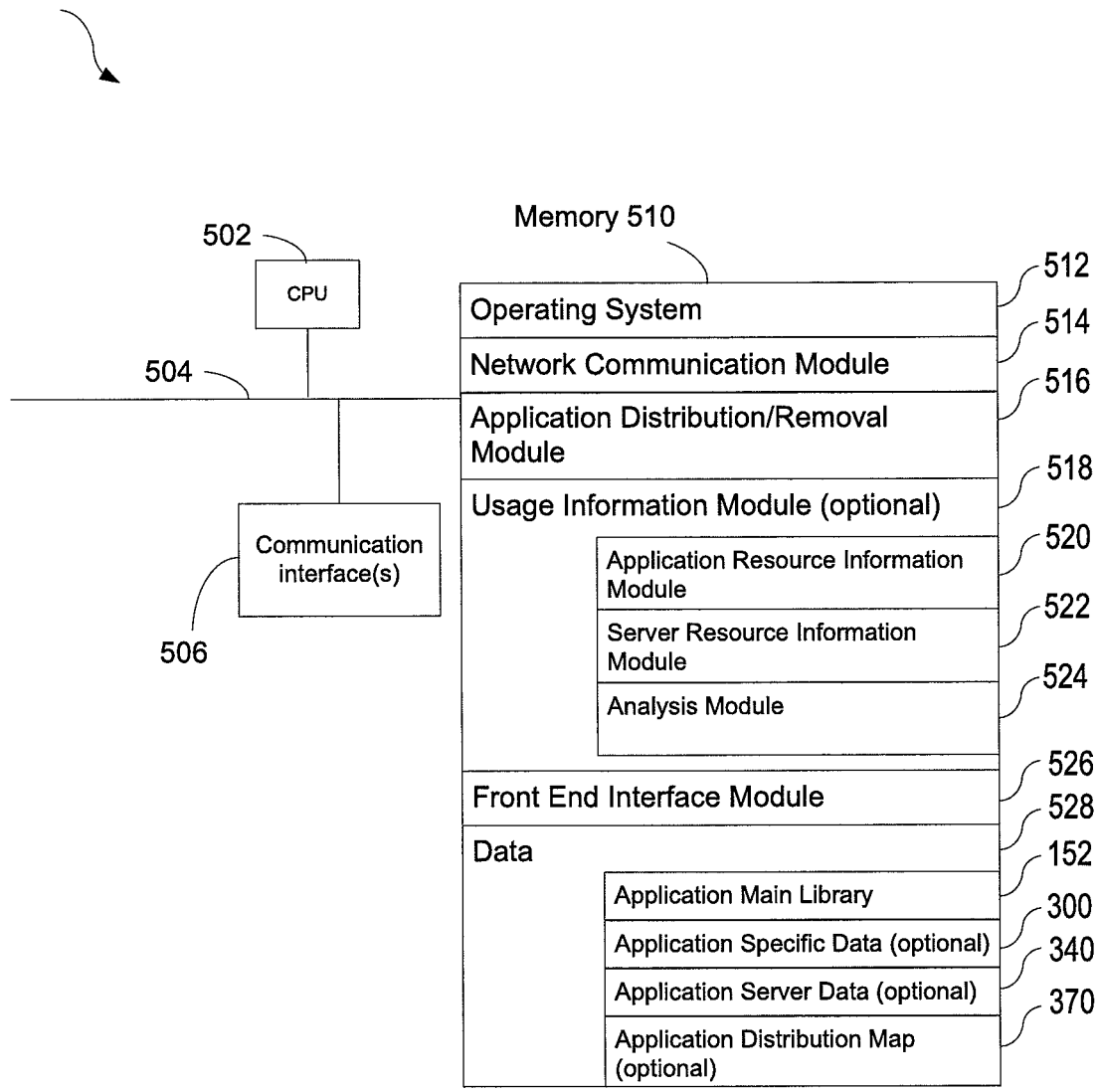
FIG. 5 is a block diagram of an application master in accordance with some embodiments.

FIG. 5 is a block diagram of an application master 150, which may implemented using one or more servers. For convenience, the application master 150 is herein described as implemented using a single server or other computer. The application master 150 generally includes one or more processing units (CPU's) 502, one or more network or other communications interfaces 506, memory 510, and one or more communication buses 504 for interconnecting these components. The communication buses 504 may include circuitry (sometimes called a chipset) that interconnects and controls communications between system components. Memory 510 may include high speed random access memory such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 510 may include mass storage (e.g., data store 170, data store 180 of FIG. 1) that is remotely located from the central processing unit(s) 502. Memory 510, or alternately the non-volatile memory device(s) within memory 510, includes a non-transitory computer readable storage medium. In some embodiments, memory 510 or the computer readable storage medium of memory 510 stores the following programs, modules and data structures, or a subset thereof:

- an operating system 512 that includes procedures for handling various basic system services and for performing hardware dependent tasks;
- a network communication module 514 that is used for connecting the application master 150 to other computers via the one or more communication network interfaces 506 (wired or wireless) and one or more communication networks, such as the Internet, other wide area networks, local area networks, metropolitan area networks, and the like;

an application distribution/removal module 516 that is used in some embodiments for distributing respective applications from the main library 152 (FIG. 1) to the application servers 160 for storage in non-volatile storage of the application servers either before or after the respective applications have been primed; the application distribution/removal module 516 also optionally includes instructions for removing previously distributed applications from the non-volatile storage of respective application servers in accordance with the methods disclosed herein;

an optional usage information module 518 that includes procedures for monitoring the application servers to generate information such as usage information;

a front end interface module 526 that is used for interfacing with the front end servers 140 (FIG. 1); and data 528, which includes the main library data 152, and optionally includes application specific data 300, application server data 340, and/or the application distribution map 370.

The procedures in the optional usage information module 518 include an Application Resource Information Module 520 to retrieve application resource information, and a server resource information module 522 to retrieve resource information concerning the application servers. In some embodiments, the usage information module 518 also includes one or more procedures 524 (Analysis Module) for analyzing the retrieved application resource and server resource information to generate usage statistics.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 510 may store a subset of the modules and data structures identified above. Furthermore, memory 510 may store additional modules and data structures not described above.

Figure 6:
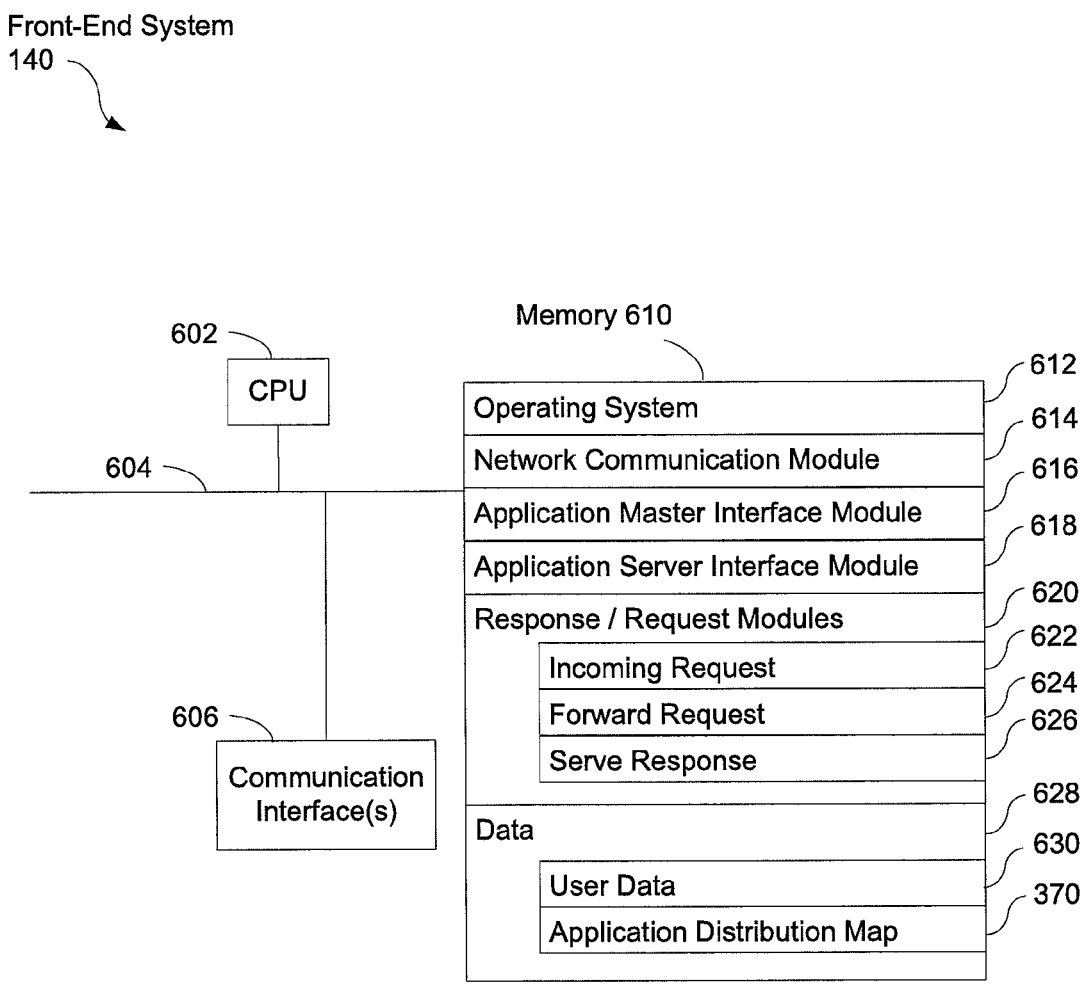
FIG. 6 is a block diagram of a front-end system in accordance with some embodiments.

FIG. 6 is a block diagram of a front-end system 140, which may implemented using one or more servers. For convenience, the front-end system 140 is herein described as implemented using a single server or other computer. The front-end system 140 generally includes one or more processing units (CPU's) 602, one or more network or other communications interfaces 606, memory 610, and one or more communication buses 604 for interconnecting these components. The communication buses 604 may include circuitry (sometimes called a chipset) that interconnects and controls communications between system components. Memory 610 may include high speed random access memory such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 610 may include mass storage (e.g., data store 170, data store 180 of FIG. 1) that is remotely located from the central processing unit(s) 602. Memory 610, or alternately the non-volatile memory device(s) within memory 610, includes a non-transitory computer readable storage medium. In some embodiments, memory 610 or the computer readable storage medium of memory stores the following programs, modules and data structures, or a subset thereof:

an operating system 612 that includes procedures for handling various basic system services and for performing hardware dependent tasks;

a network communication module 614 that is used for connecting the front-end server 140 to other computers via the one or more communication network interfaces 606 (wired or wireless) and one or more communication networks, such as the Internet, other wide area networks, local area networks, metropolitan area networks, and the like;

an application master interface module 616 that is used for interfacing with the application master 150 (FIG. 1);

an application server interface module 618 that is used for interfacing with the application servers 160-1 to 160-n (FIG. 1);

response and request modules 620 for handling incoming client 102 requests for applications. In some embodiments, the response and request modules 620 include procedures for receiving incoming requests (e.g., Incoming HTTP Request) 622 and for forwarding the HTTP request to application servers 160 (FIG. 1) that host the requested primed application (Forward HTTP Request) 624. The response and request modules 620 may also include procedures for serving responses from the application servers 160 to the clients 102 (Serve HTTP Response) 626.

data 628 which includes user data 630 and the application distribution map 370. In some embodiments, the user data 630 include client-specific information passed to the front-end 140 by the client 102 (e.g., parameters embedded in the HTTP request). The application distribution map 370 includes information used by the front-end to route application processing requests to application servers.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 610 may store a subset of the modules and data structures identified above. Furthermore, memory 610 may store additional modules and data structures not described above.

Figure 7:
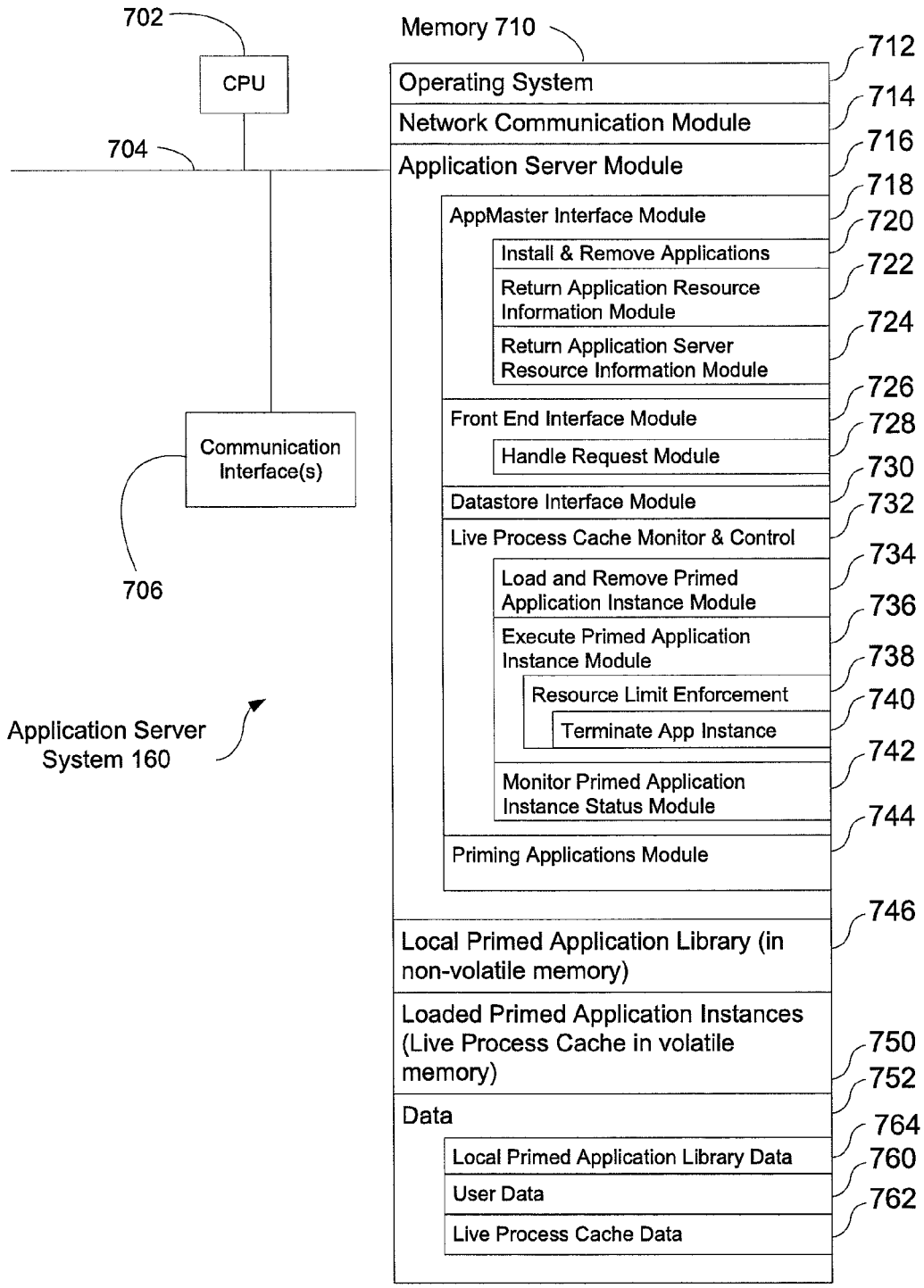
FIG. 7 is a block diagram of an application server in accordance with some embodiments.

FIG. 7 is a block diagram of an application server 160, which may implemented using one or more servers. For convenience, the application server 160 is herein described as implemented using a single server or other computer. The application server 160 generally includes one or more processing units (CPU's) 702, one or more network or other communications interfaces 706, memory 710, and one or more communication buses 704 for interconnecting these components. The communication buses 704 may include circuitry (sometimes called a chipset) that interconnects and controls communications between system components. Memory 710 may include high speed random access memory such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 710 may include mass storage (e.g., data store 170, data store 180, of FIG. 1) that is remotely located from the central processing unit(s) 702. Memory 710, or alternately the non-volatile memory device(s) within memory 710, includes a non-transitory computer readable storage medium. In some embodiments, memory 710 or the computer readable storage medium of memory stores the following programs, modules and data structures, or a subset thereof:

- an operating system 712 that includes procedures for handling various basic system services and for performing hardware dependent tasks;
- a network communication module 714 that is used for connecting the application server 160 to other computers via the one or more communication network interfaces 706 (wired or wireless) and one or more communication networks, such as the Internet, other wide area networks, local area networks, metropolitan area networks, and the like;
- an application server module 716 that is used for processing application requests. In some embodiments, the application server module 716 includes an application master interface module 718 for interfacing with the application master 150 (FIG. 1), a front-end interface module 726 for interfacing with the front-end 140, a data store interface module 730 for interfacing with the data store 170, a priming applications module 744 for preparing primed applications (FIG. 3), and a live process cache monitor and control 732 for managing primed application instances in the live process cache 450 (FIG. 4B). The priming applications module 744 derives primed applications from unprimed applications, and stores the primed applications in non-volatile storage such as the local primed application library 746. In some embodiments, after a primed application is derived by the priming applications module 744, the primed application is stored on other application server systems (e.g., 160-n) in addition to being stored in the application server's local primed application library 746. Some of the procedures included in the application server module 716 are further described below.
- a local primed application library 746, for storing the applications after they have been primed;
- primed application instances in volatile memory 750 (e.g., in a live process cache 450, FIG. 4B) for servicing application requests. In some embodiments, there is at least one primed application instance in volatile memory.
- data 752, including local primed application library data 764, which includes identification information about the local primed applications available. When needed, data 752 includes user data 760, which may include data received from a requesting user (e.g., user name, passwords, user preferences, profiling information) and/or data produced or retrieved for the requesting user by the application server. In addition, data 752 may include live process cache data 762, described below with reference to FIG. 8.

In some embodiments, the application master interface module 718 includes procedures 720 for adding or removing primed applications from the non-volatile storage of the application server (Install & Remove Applications). The application master interface module 718 may also optionally include procedures 722, 724 for sending usage information on application resources (Return Application Resource Information Module) and server resources (Return Application Server Resource Information Module) to the application master. In some embodiments, the front end interface module 726 includes procedures for handling application requests (Handle Request Module) 728 forwarded from the front end 140.

In some embodiments, the application server module 716 also includes procedures (Live Process Cache Monitor & Control) 732 for monitoring and controlling the live process cache. These procedures include procedures (Load and Remove Primed Application Instance Module) 734 for loading and removing primed application instances into the live process cache in accordance with application usage and available volatile memory. There are also procedures (Execute Primed Application Instance Module) 736 for executing primed application instances when processing application requests.

The Execute Primed Application Instance Module 736 may also include procedures (Resource Limit Enforcement) 738 for limiting resource consumption of a particular application. For example, a primed application that consumes more resources than a limit or threshold will be terminated (Terminate App Instance) 740. The resource limit may be a predefined amount or the threshold may vary depending on factors such as the number of requests for the application. For example, applications that receive higher numbers of requests may have a higher threshold before the application instance is terminated. Alternatively, the threshold may also depend on the amount of processing resources (e.g., one or more of: CPU time, "wall clock" time (i.e., total elapsed real time), memory, communication bandwidth, and number of system function calls made) consumed by the application. The threshold(s) may be applied per execution of an application, or to a running average of resources used over multiple executions of the application. An application instance that consumes resources above a corresponding threshold may be terminated.

The live process cache monitor & control module 732 may also include procedures for monitoring the status of application instances (Monitor Primed Application Instance Status Module) 742. For example, the status of the application instances may be "busy," "available," or any transitional state in between (see FIG. 4B).

Figure 8:
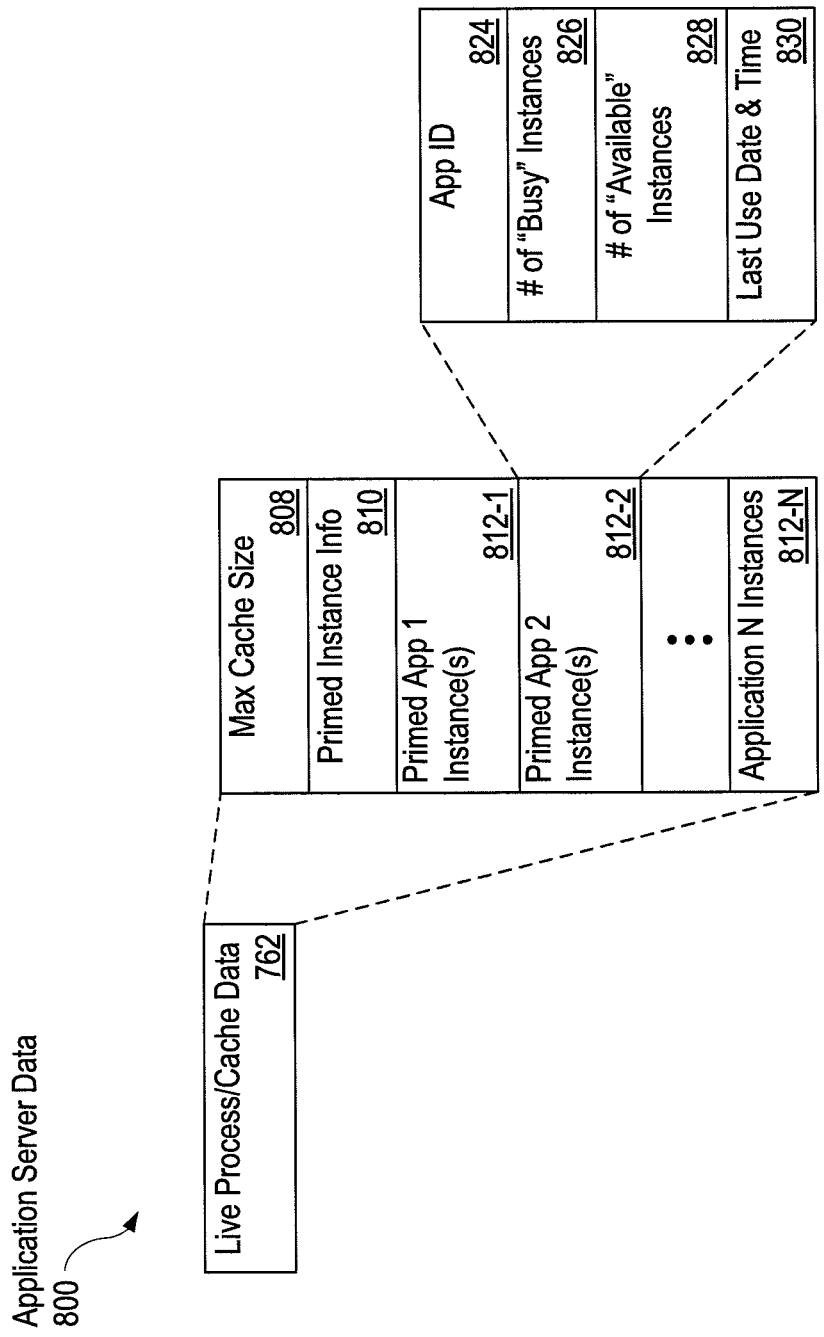
FIG. 8 is a block diagram illustrating a data structure for use by an application server for storing information relating to application instances in volatile memory in accordance with some embodiments.

FIG. 8 is a block diagram of a table or other data structure (live process ca cache data) 762 storing information relating to primed application instances stored in volatile memory (e.g., Live Process Cache 450, FIG. 4B), for processing application requests in accordance with some embodiments. As shown in FIG. 8, live process cache data 762 includes the following items of information, or a subset or superset thereof:

- cache size information 808, which may be represented (for example) in terms of memory capacity (e.g., a number of gigabytes), or a maximum number of application instances that can be stored in the live process cache;
- the information regarding the primed instances 810 that are currently available for allocation from non-volatile memory (442-1-442-N); and
- information 812 about each of the primed application instances, currently in the live process cache 450. For example, information 812 may indicate for each application having at least one instance in the live process cache, the identity 824 of the primed application, the number 826 of busy instances of the primed application, the number 828 of available instances of the primed application, and last use information 830 (e.g., the date/time of last use of the application, or other information sufficient to enable implementation of a cache eviction policy).

Each of the above identified elements in FIGS. 7 and 8 may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 710 may store a subset of the modules and data structures identified above. Furthermore, memory 710 may store additional modules and data structures not described above.

Although FIGS. 5, 6 and 7 show an application master, a front end server, and an application server, these figures are intended more as functional descriptions of the various features which may be present in a set of servers than as a structural schematic of the embodiments described herein. In practice, and as recognized by those of ordinary skill in the art, items shown separately could be combined and some items could be separated. For example, some items shown separately in FIG. 5, 6 or 7 could be implemented on single servers and single items could be implemented by one or more servers. The actual number of servers used to implement each such subsystem and how features are allocated among them will vary from one implementation to another, and may depend in part on the amount of data traffic that the system must handle during peak usage periods as well as during average usage periods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An application execution system, comprising:
a plurality of application servers, each application server in the plurality of application servers comprising non-volatile storage for storing a plurality of applications, volatile storage, and computational resources for executing applications in response to requests received by the application execution system;
an application server in the plurality of application servers including instructions for:
storing in non-volatile storage a plurality of applications distributed to the application server, wherein an application in the plurality of applications is a primed application, in a primed state, wherein the primed state is derived by:
executing an unprimed application;
obtaining a status signal from the unprimed application;
checkpointing the unprimed application upon receipt of the status signal, to produce the primed application; and
storing the primed application in the non-volatile storage;
receiving from a client system, distinct from the plurality of application servers, a request to execute the primed application;
in response to the request, loading the primed application from non-volatile storage into volatile storage and executing the primed application; and
returning to the client system a first result to the request, wherein the first result is provided by the primed application.

2. The application execution system of claim 1, further comprising instructions for:
terminating the primed application from volatile storage after the first result is returned.

3. The application execution system of claim 1, further comprising instructions for:
retaining the primed application in volatile storage after the first result is returned; and
returning a second result to the additional request, wherein the second result is provided by the primed application.

4. The application execution system of claim 1, further comprising an application master comprising non-volatile storage and volatile storage, wherein the application master includes instructions for:
distributing the unprimed application to respective application servers in the plurality of respective application servers.

5. The application execution system of claim 1, wherein the primed application program is produced on the application server.

6. The application execution system of claim 1, further comprising instructions for:
communicating an initialization signal to the unprimed application prior to obtaining the status signal.

7. The application execution system of claim 6, wherein the obtaining a status signal from the unprimed application is responsive to the communication of the initialization signal to the unprimed application.

8. The application execution system of claim 6, wherein the initialization signal comprises an ASCII character string, a carriage return, a control code, or an interrupt.

9. The application execution system of claim 1, further comprising instructions for:
verifying the status signal against a predetermined value wherein, when the status signal matches the predetermined value, performing the checkpointing and the storing.

10. A method of operating an application server in a system having a plurality of application servers, the method comprising:
(A) storing in non-volatile storage of an application server, in the plurality of application servers, a plurality of applications distributed to the application server, wherein an application in the plurality of applications is a primed application, in a primed state, wherein the primed state is derived by:
(i) executing an unprimed application,
(ii) obtaining a status signal from the unprimed application,
(iii) checkpointing the unprimed application upon receipt of the status signal, thereby deriving the primed application, and
(iv) storing the primed application in the non-volatile storage of the application server;
(B) loading the primed application to a volatile storage of the application server from the non-volatile storage and executing the primed application in response to a request received by the application server; and
(C) returning a first result to the request that is provided by the primed application.

11. The method of claim 10, further comprising:
(D) terminating the primed application from the volatile storage after the first result is returned.

12. The method of claim 10, further comprising:
(D) retaining the primed application in the volatile storage after the first result is returned; and
(E) returning a second result to the additional request, wherein the second result is provided by the primed application.

13. The method of claim 10, further comprising distributing the primed application to respective application servers in the plurality of respective application servers.

14. The method of claim 10, wherein the primed application program is produced on the application server.

15. The method of claim 10, wherein an initialization signal is communicated to the unprimed application prior to obtaining the status signal from the unprimed application.

16. The method of claim 15, wherein the obtaining a status signal from the unprimed application is responsive to the communication of the initialization signal to the unprimed application.

17. The method of claim 15, wherein the status signal comprises an ASCII character string, a carriage return, a control code, or an interrupt.

18. The method of claim 10, wherein the status signal is verified against a predetermined value wherein, when the status signal matches the predetermined value, the checkpointing (iii) and storing (iv) are performed.

19. A non-transitory computer readable storage medium storing one or more programs for execution by one or more processors of an application server in an application execution system having a plurality of application servers, the one or more programs comprising instructions for:
(A) storing, in a non-volatile storage of the application server, applications distributed to the application server; wherein an application in the plurality of applications is a primed application, in a primed state, wherein the primed state is derived by:
  (i) executing an unprimed application;
  (ii) obtaining a status signal from the unprimed application;
  (iii) checkpointing the unprimed application upon receipt of the status signal, thereby deriving the primed application; and
  (iv) storing the primed application in the non-volatile storage;
(B) loading the primed application from the non-volatile storage to a volatile storage of the application server and executing the primed application in response to a request received by the application execution system from a client; and
(C) returning a first result to the request that is provided by the primed application.

20. The non-transitory computer readable storage medium of claim 19, further comprising instructions for:
(D) terminating the primed application from the volatile storage after the first result is returned.

21. The non-transitory computer readable storage medium of claim 19, further comprising instructions for:
(D) retaining the primed application in the volatile storage after the first result is returned;
(E) returning a second result to the additional request, wherein the second result is provided by the primed application.

22. The non-transitory computer readable storage medium of claim 19, further comprising instructions for distributing the primed application to respective application servers in the plurality of application servers.

23. The non-transitory computer readable storage medium of claim 19, wherein the primed application program is produced on the application server.

24. The non-transitory computer readable storage medium of claim 19, wherein an initialization signal is communicated to the unprimed application prior to obtaining the status signal from the unprimed application.

25. The non-transitory computer readable storage medium of claim 24, wherein the obtaining a status signal from the unprimed application is responsive to the communication of the initialization signal to the unprimed application.

26. The non-transitory computer readable storage medium of claim 19, wherein the status signal comprises an ASCII character string, a carriage return, a control code, or an interrupt.

27. The non-transitory computer readable storage medium of claim 19, wherein the status signal is verified against a predetermined value wherein, when the status signal matches the predetermined value, the checkpointing (iii) and storing (iv) are performed.

* * * * *